Dec. 18, 1956  S. E. MILLER  2,774,945
METHODS AND APPARATUS FOR TRANSMITTING CIRCULAR
ELECTRIC WAVES IN WAVE GUIDES
Filed Nov. 10, 1951  12 Sheets-Sheet 1

TM$_{11}''$ MODE ELECTRIC FIELD

TM$_{11}'$ MODE ELECTRIC FIELD

INVENTOR
S. E. MILLER
BY
H. O. Wright
ATTORNEY

INVENTOR
S. E. MILLER

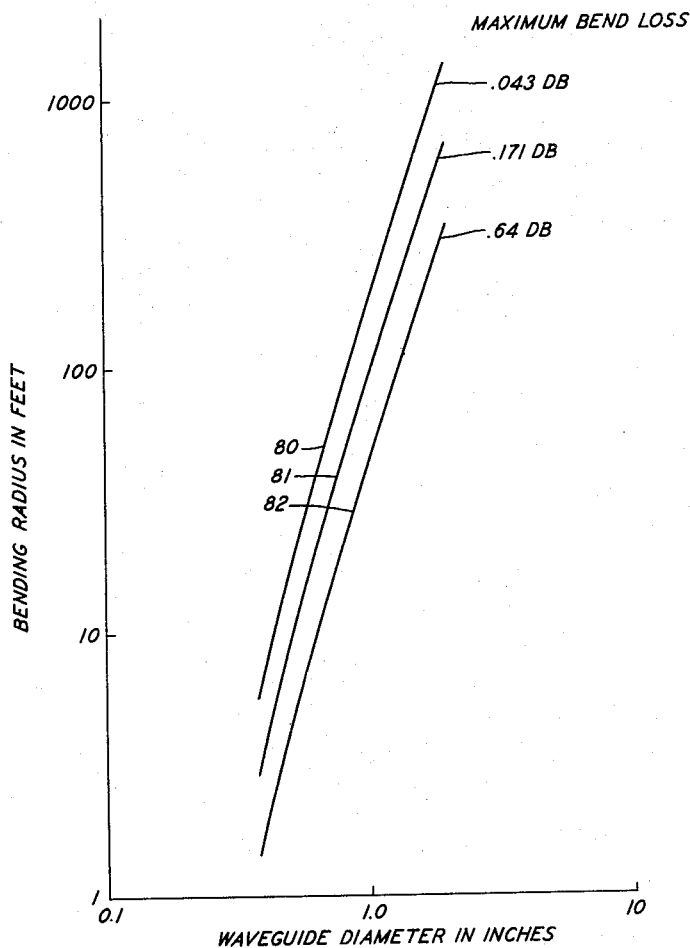

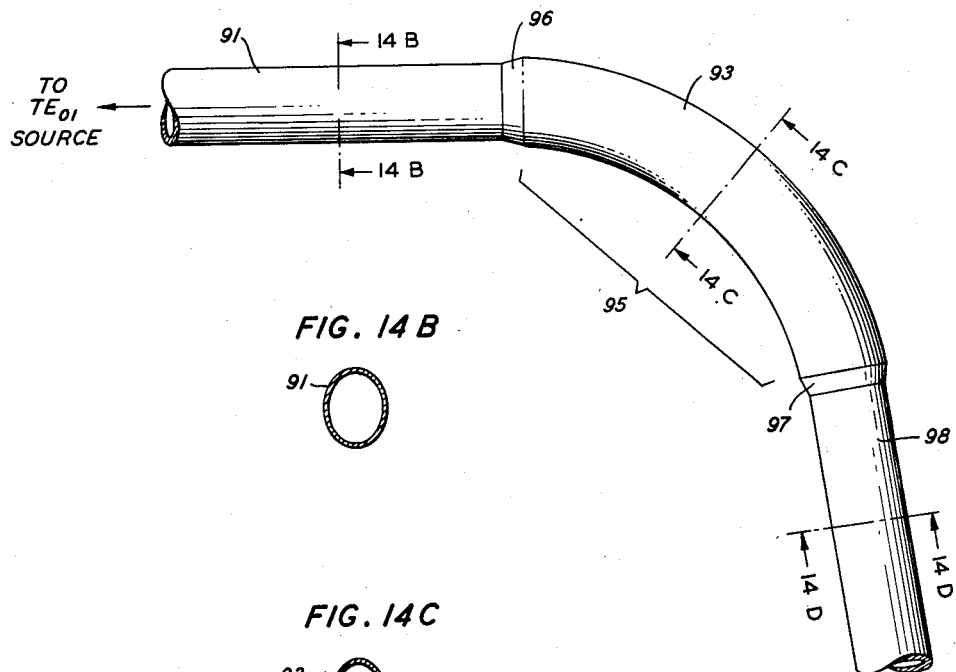
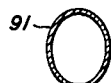

Dec. 18, 1956 S. E. MILLER 2,774,945
METHODS AND APPARATUS FOR TRANSMITTING CIRCULAR
ELECTRIC WAVES IN WAVE GUIDES
Filed Nov. 10, 1951 12 Sheets-Sheet 8

INVENTOR
S. E. MILLER
BY
H. O. Wright
ATTORNEY

Dec. 18, 1956 S. E. MILLER 2,774,945
METHODS AND APPARATUS FOR TRANSMITTING CIRCULAR
ELECTRIC WAVES IN WAVE GUIDES
Filed Nov. 10, 1951 12 Sheets-Sheet 9

INVENTOR
S. E. MILLER
BY
H. O. Wright
ATTORNEY

Dec. 18, 1956 S. E. MILLER 2,774,945
METHODS AND APPARATUS FOR TRANSMITTING CIRCULAR
ELECTRIC WAVES IN WAVE GUIDES
Filed Nov. 10, 1951 12 Sheets-Sheet 10
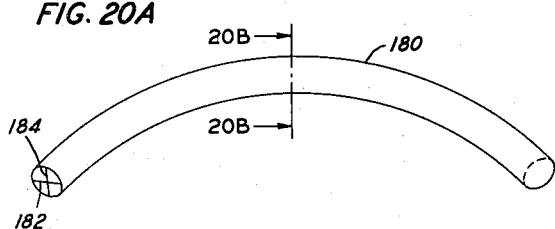
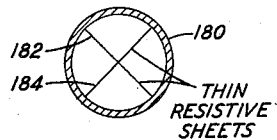
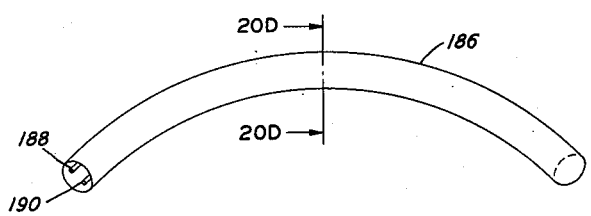
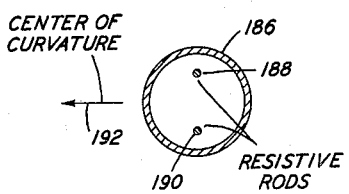
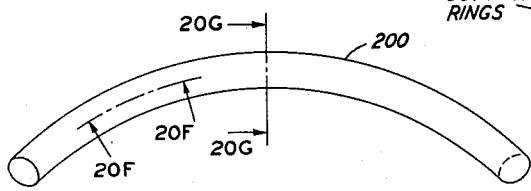
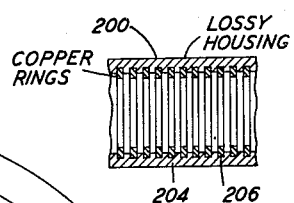
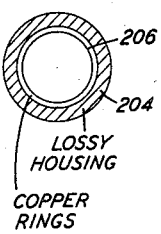
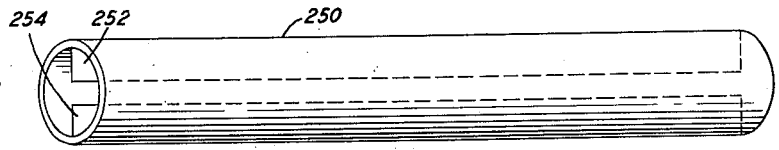
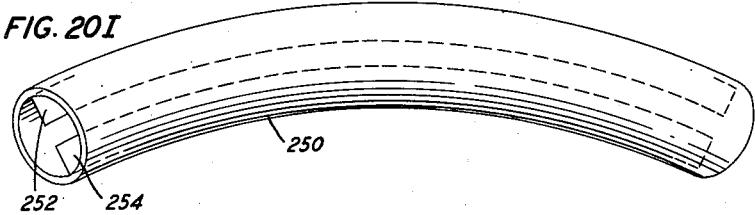
INVENTOR
S. E. MILLER
BY
H. O. Wright
ATTORNEY

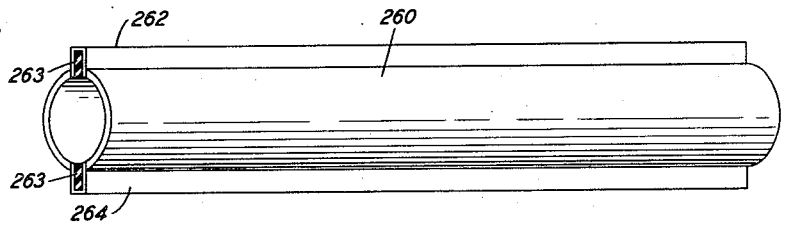
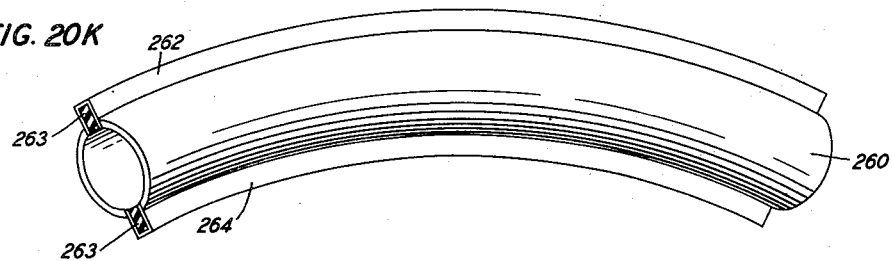
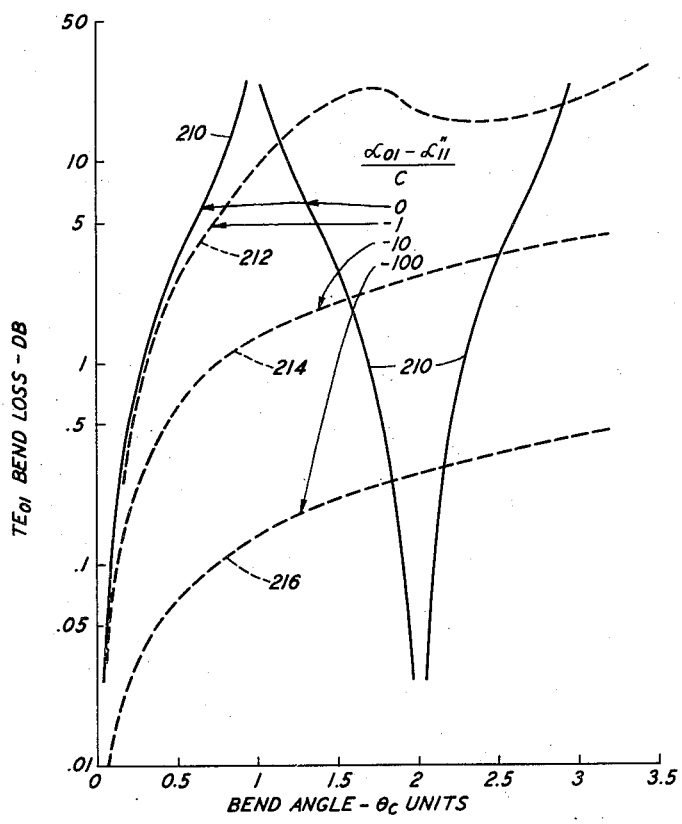

United States Patent Office

2,774,945
Patented Dec. 18, 1956

2,774,945

METHODS AND APPARATUS FOR TRANSMITTING CIRCULAR ELECTRIC WAVES IN WAVE GUIDES

Stewart E. Miller, Middletown, N. J., assignor to Bell Telephone Laboratories, Incorporated, New York, N. Y., a corporation of New York Application November 10, 1951, Serial No. 255,835

4 Claims. (Cl. 333—98)

This invention relates to methods of and apparatus for minimizing or eliminating energy losses resulting from the tendency of $TE_{01}$ circular electric high frequency electromagnetic waves to degenerate into spurious or unwanted modes in curved portions of a wave guide of circular cross-section, during transmission of said wave along the wave guide.

The propagation of microwave energy in the form of $TE_{01}$ waves in circular electric wave guides appears very desirable for the long distance transmission of wide frequency ranges or bands of signals since the attenuation characteristic of this transmission mode, unlike that of all other modes, decreases with increasing frequency. However, one difficulty encountered with this method of transmission arises from the fact that the $TE_{01}$ mode is not the dominant mode supported in a wave guide of circular cross-section (commonly referred to as a round wave guide), and consequently energy may be lost to other modes also capable of transmission therein. In an ideal wave guide of circular cross-section which is perfectly straight, uniform and conducting, the propagation of $TE_{01}$ (circular electric) waves therethrough is undisturbed, but slight imperfections in the guide and especially curvature of the longitudinal wave-guide axis may excite waves of other modes and produce serious losses. These losses are attributed mainly to the fact that the curvature or bending of the guide produces a coupling between the desired $TE_{01}$ and other transmission modes, mainly the $TM_{11}$ mode.

In the article entitled "Propagation of $TE_{01}$ waves in curved wave guides" by W. J. Albersheim, appearing in the January 1949 issue of the Bell System Technical Journal, vol. 28, No. 1, the nature of this mode coupling is analyzed and is likened to that between traveling alternating-current waves in coupled transmission lines. Each mode capable of transmission in the wave guide is analogous to a separate transmission line. Since the predominant losses considered herein occur in curved portions of the guide and result from interaction between the $TE_{01}$ and $TM_{11}$ modes, it will be sufficient to consider two coupled lines; a "primary line" representing the desired or $TE_{01}$ mode and a "secondary line" representing the undesired or $TM_{11}$ mode.

In two such lines there exists for each frequency and direction of travel two distinct traveling wave configurations, from the superposition of which all possible current distributions may be built up. In the limiting case when the lines are uncoupled, these configurations consist of a wave in the primary line alone and a wave in the secondary line alone. When the lines are coupled, it is not possible to impress a current on one line alone without generating a secondary current in the other line. The two possible wave configurations in the second case are (a) one in which the electromagnetic fields, generated by the currents in the two lines, tend to be in phase and reinforce each other, and (b) one in which the fields tend to be in opposite phase and weaken each other. In view of the greater energy storage, configuration a has a slower phase velocity than configuration b, so that if both configurations coexist, there will be beats between them as they travel along the two lines. Due to the different phase relations between primary and secondary currents in the two configurations, these beats alternately increase and decrease the current in each line in a sinusoidal manner. If at the point of origin, current is made to flow in the primary line only, configurations a and b will coexist in such amplitude and phase relations that their components cancel each other out in the secondary line at that point; at other points along the lines energy will be transferred in increasing or decreasing amounts into the secondary line so that a sinusoidal current flow in that line will be observed.

The amount of energy transferred between the lines per unit length has been shown in the above-mentioned Bell System Technical Journal paper to depend upon the coupling discriminant $\kappa$ which is defined as the coupling coefficient $k$ divided by the relative difference in propagation constants and may be expressed as follows:

$$\kappa = \frac{k}{\Gamma_1 - \Gamma_2}\sqrt{\Gamma_1 \Gamma_2} \qquad (1)$$

The coupling coefficient $k$ may be expressed broadly in terms of the energy stored in the individual lines 1 and 2 and the energy transferred from one line to the other. The above-mentioned Bell System Technical Journal article shows that if the coupling discriminant is much smaller than 1, only a small fraction of the energy originally flowing in the primary line will be transferred to the secondary line before the energy flow is reversed; if the coupling discriminant is much larger than unity, nearly the entire energy flows back and forth between primary and secondary lines.

Applying the above transmission line analogy to the coupling between the desired $TE_{01}$ mode and the $TM_{11}$ mode (or in exceptional cases, other undesired transmission modes) in a wave guide containing intentional or fortuitous curvatures, it has been shown in the above-mentioned Bell System Technical Journal article that the coupling coefficient $k$ is proportional to the curvature and to the diameter of the wave guide. The relative difference in propagation constants $$\frac{\Gamma_1 - \Gamma_2}{\sqrt{\Gamma_1(\Gamma_2)}}$$

between the $TE_{01}$ and $TM_{11}$ modes is very small in a smooth highly conductive wave guide and approaches zero in a wave guide of zero resistivity.

From this it follows that in an ordinary smooth waveguide bend the coupling discriminant $\kappa$, as expressed in Equation 1 above, tends to be large so that nearly the entire energy of the $TE_{01}$ mode impressed upon the beginning of the bend may be transferred to the $TM_{11}$ mode by interference between the two configurations consisting of combinations of "primary" and "secondary" currents, i. e., of $TE_{01}$ and $TM_{11}$ components.

Accordingly, it is a general object of the present invention to provide $TE_{01}$ circular wave-guide designs wherein losses resulting from curvature of the guide are substantially reduced or eliminated.

Another object of the invention is to provide wave guides which when curved will have broad band low loss transmission characteristics for $TE_{01}$ circular electric waves.

A further object is to provide wave guides wherein degeneration of $TE_{01}$ waves into $TM_{11}$ waves in the curved portions thereof is substantially eliminated.

Other and further objects will become apparent during the following detailed description of illustrative structures embodying the principles of the invention and from the appended claims and the accompanying drawings, in which:

Fig. 1 illustrates a length of wave guide of circular cross-section having a bend or curvature in a single plane;

Figs. 2A and 2B, respectively, illustrate the electric field directions for the $TM_{11}''$ and $TM_{11}'$ modes of waveguide propagation in a wave guide of circular cross-section;

Figure 5:
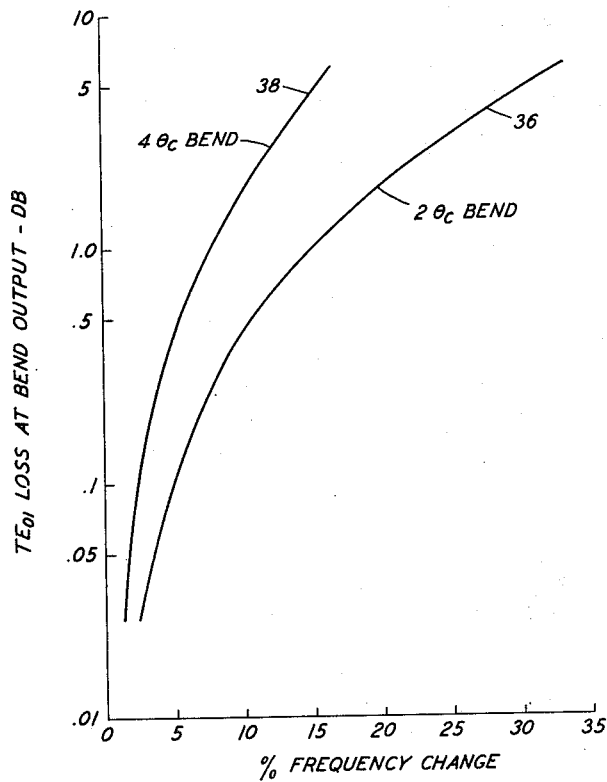
Figure 6A:
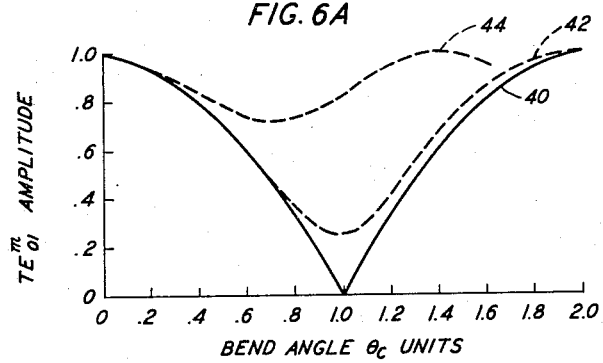
Figure 6B:
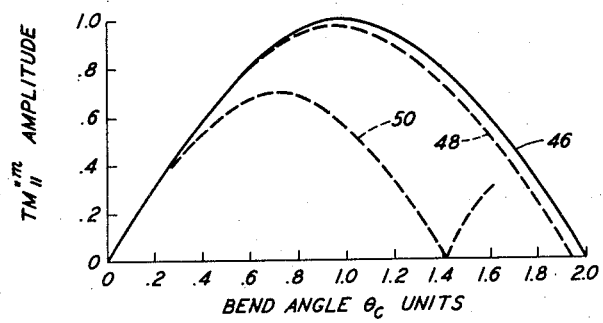
Figure 7:
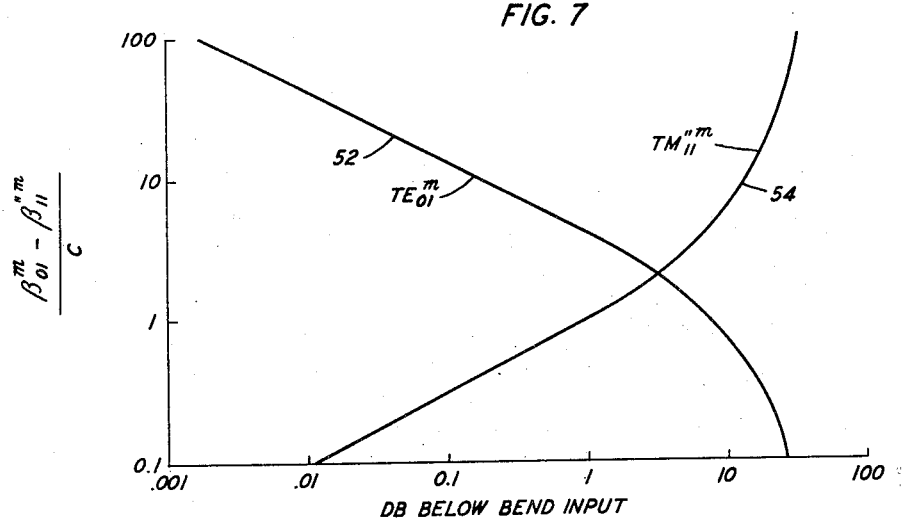
Figure 8:
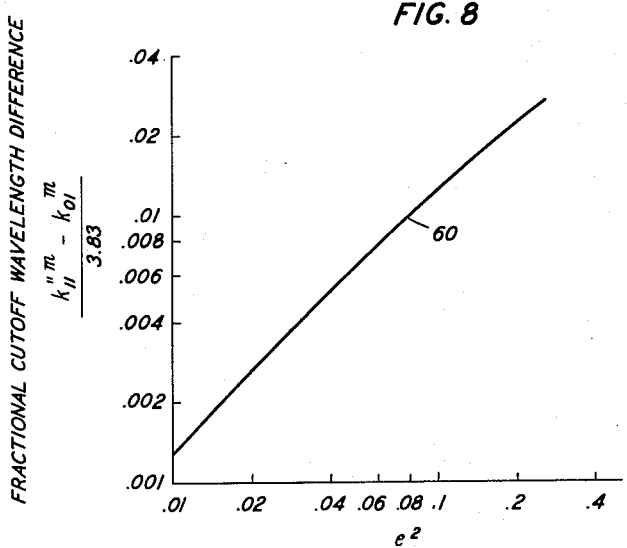
Figure 9A:
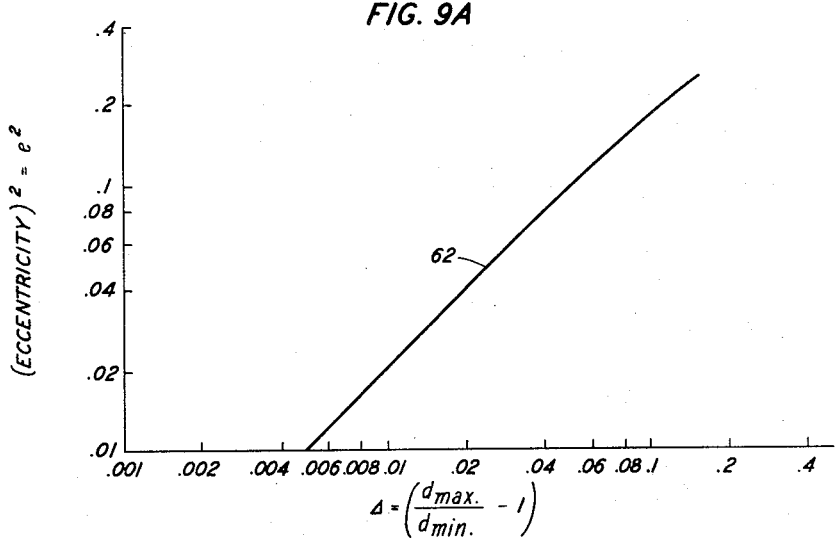
Figure 9B:
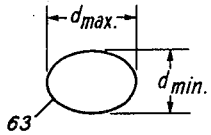
Figure 10:
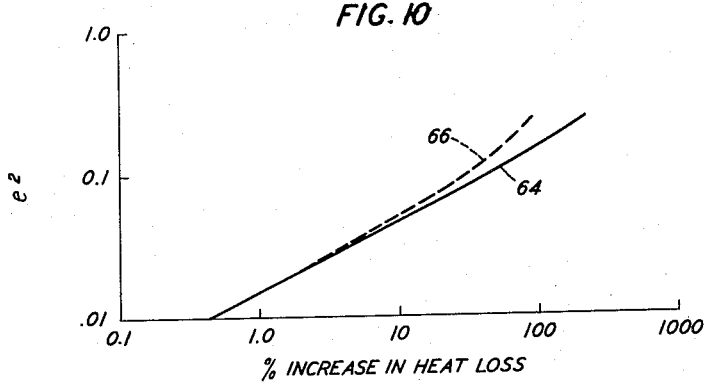
Figure 11:
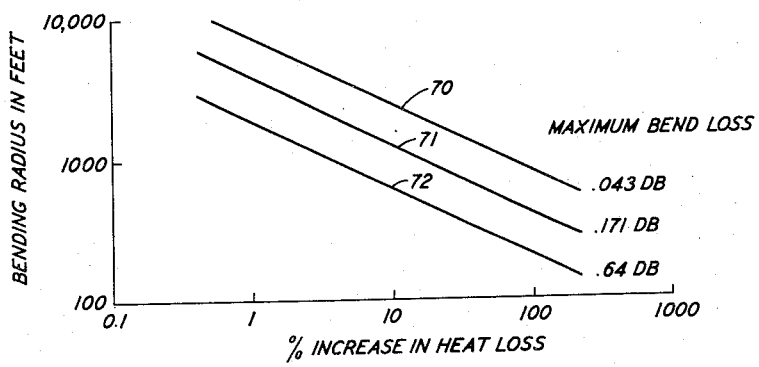
Figure 12:
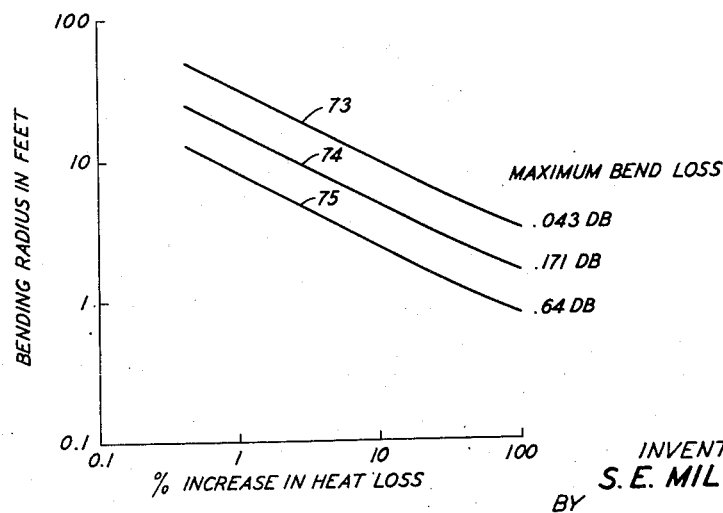
Figure 15:
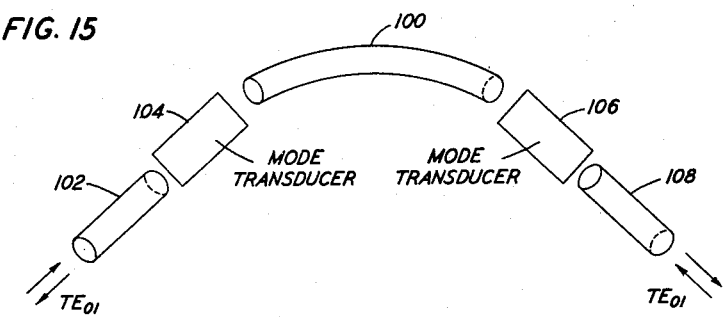
Figure 17A:
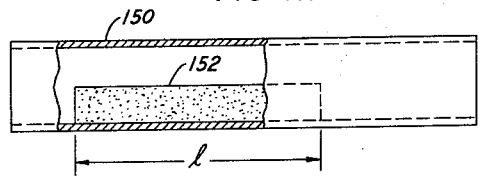
Figure 17B:
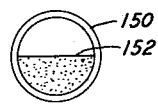
Figure 18:
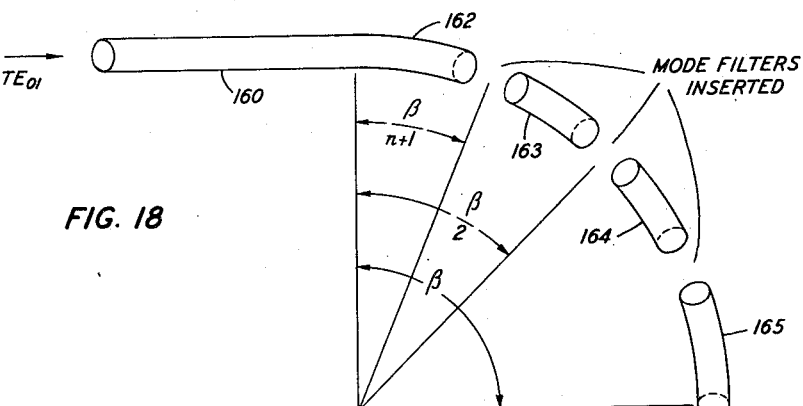
Figure 19:
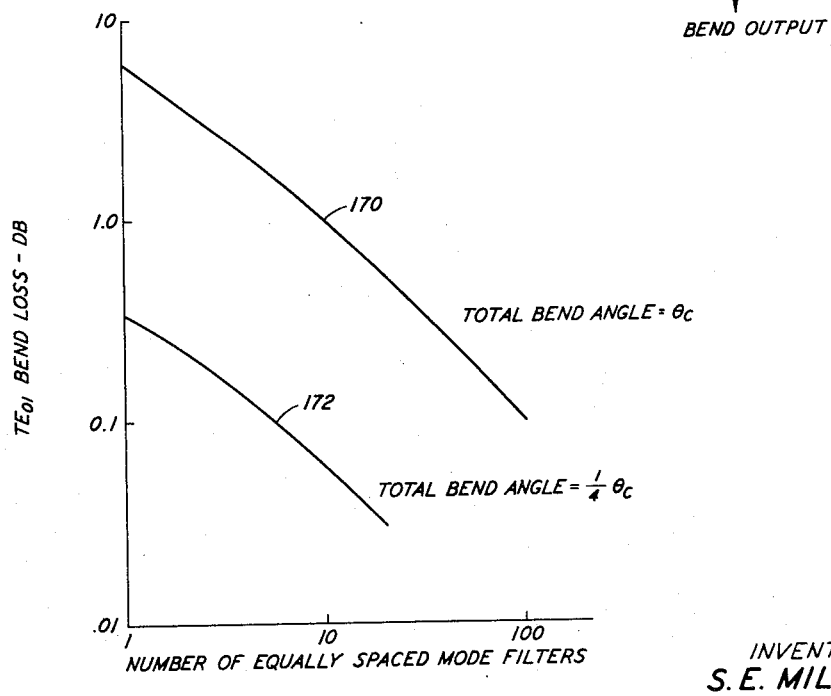
Figure 22:
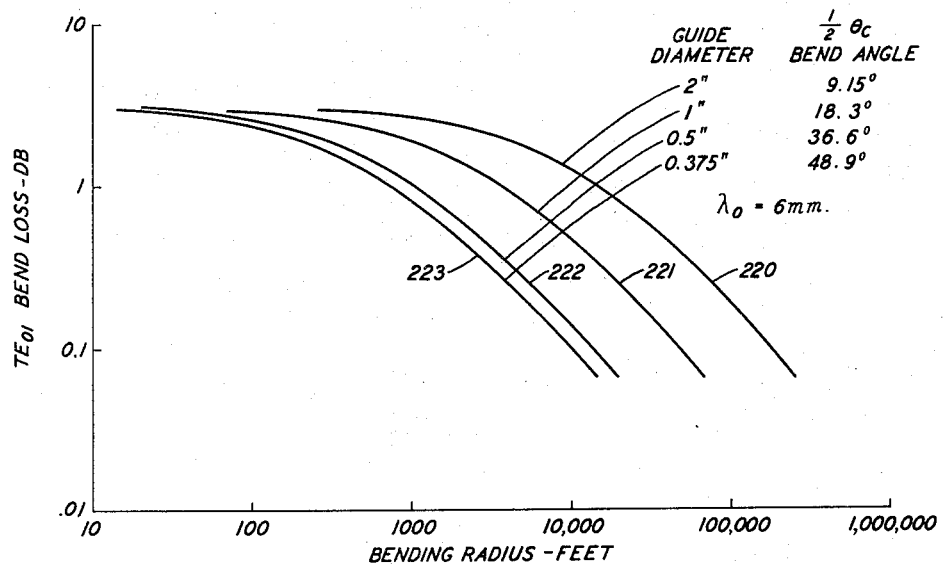
Figure 23:
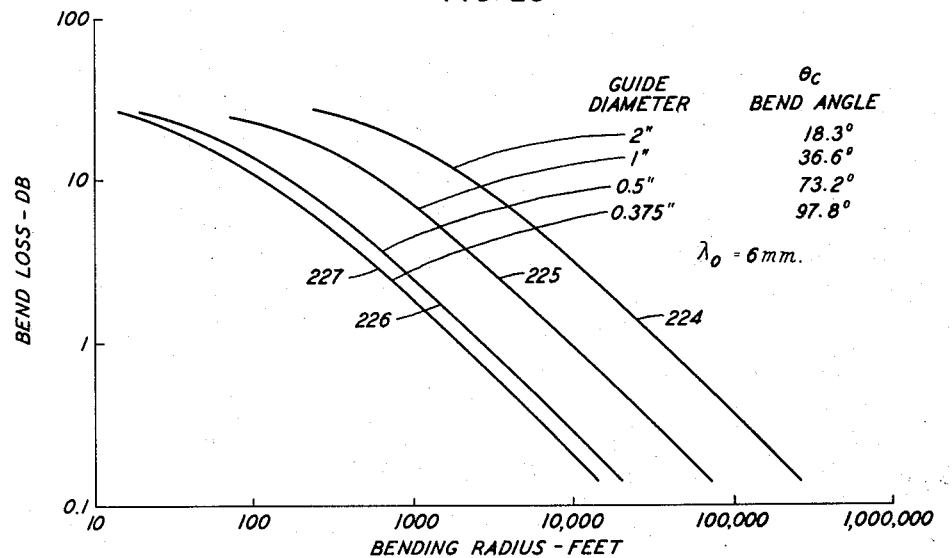

Fig. 5 comprises curves showing $TE_{01}$ circular electric wave loss and theoretical band width of discrete angle, single plane, bends in a wave guide of circular cross-section;

Figs. 6A and 6B comprise curves showing $TE_{01}{}^m$ and $TM_{11}''{}^m$ output amplitudes, respectively, as the angle of the bend is varied from zero to $2\theta_c$;

Fig. 7 comprises curves showing $TE_{01}{}^m$ and $TM_{11}''{}^m$ wave amplitudes versus $$\frac{\beta_{01}{}^m - \beta_{11}''{}^m}{c}$$

at the bend angle of maximum conversion;

Figs. 8, 9A, 10 to 13, inclusive, show curves relating to the effects on $TE_{01}$ and $TM_{11}$ waves of making the normally circular cross-section of the wave guide slightly elliptical, Fig. 9B illustrating diagrammatically the maximum and minimum diameters of the elliptical section;

Figs. 14A–14D illustrate a system employing waveguide of elliptical cross-section as shown in Fig. 9B;

Fig. 15 illustrates a so-called "normal mode solution" to the problem of transmitting $TE_{01}$ wave energy through a longitudinal curve or bend in a wave guide of circular cross-section;

Figs. 16A to 16D, inclusive, show mode transducers suitable for use in the arrangement of Fig. 15;

Figs. 17A and 17B show an alternative type of mode transducer;

Fig. 18 illustrates in diagrammatic form an arrangement employing a plurality of mode filters in a longitudinal wave-guide curve or bend employing a wave guide of circular cross-section;

Fig. 19 illustrates effects obtainable with the structures of the type illustrated by Fig. 18;

Figs. 20A to 20K, inclusive, illustrate five structural arrangements employing dissipation in wave-guide bends to prevent loss of $TE_{01}$ wave energy to spurious or unwanted mode waves;

Fig. 21 comprises curves illustrating effects obtainable with the devices of Figs. 20A to 20K, inclusive; and Figs. 22 and 23 comprise curves showing bend loss versus bend radius for bends of one-half and a full critical (discrete or extinctive) angle, respectively, for each of several values of diameter of a wave guide of circular cross-section.

The present invention is concerned generally with methods and structures for combatting the tendency for energy being transmitted in the form of $TE_{01}$ mode waves along a wave guide of circular cross-section to be converted out of said mode into spurious or unwanted modes, principally into the $TM_{11}$ mode, in longitudinally curved or bent portions of the wave guide.

Three general methods are suggested to counteract or circumvent this tendency and are the following:

(1) Elimination of the tendency to degenerate into the $TM_{11}$ mode.

(2) Conversion of the $TE_{01}$ mode wave to a mode wave which is a normal mode for the longitudinally curved portion of the wave guide at the input end of said portion, combined with the reconversion of the normal mode wave back to the $TE_{01}$ mode wave at the output end of said curved portion of the wave guide. Since wave-guide transmission lines are normally used for transmission in both directions, the mode converters employed at both ends of the curved portions should be "bilateral," i. e., they should not only convert $TE_{01}$ mode waves entering the curved portion to the normal mode wave selected (which may, for example, be a $TM_{11}$ mode wave) for transmission through the curved or bent portion of the guide but they should also convert the selected normal mode wave leaving the curved portion of the wave guide, back to the $TE_{01}$ mode wave.

(3) Attenuating the spurious or unwanted mode waves to a much greater degree than the $TE_{01}$ mode wave and thus substantially eliminating the transfer of power to the unwanted mode wave.

Methods 1 and 3 can, as will presently become apparent, in some instances be advantageously used in combination.

The following detailed description of illustrative embodiments, and data relating to the performance of the suggested arrangements, is, for convenience, subdivided into eight sections, as follows:

Section 1.—Characteristics of a Bend in a Round Guide with $TE_{01}$ Excitation
Section 2.—Discrete Angle Bend Solution
Section 3.—Solution by Degeneracy Removal
Section 4.—Elliptic Wave-Guide Solution
Section 5.—Alternate Methods of Removing the Degeneracy
Section 6.—Normal Mode Solution
Section 7.—The Dissipation Solution
Section 8.—Conclusions

*Section 1.—Characteristics of a bend in a round guide with $TE_{01}$ excitation*

Figure 1:
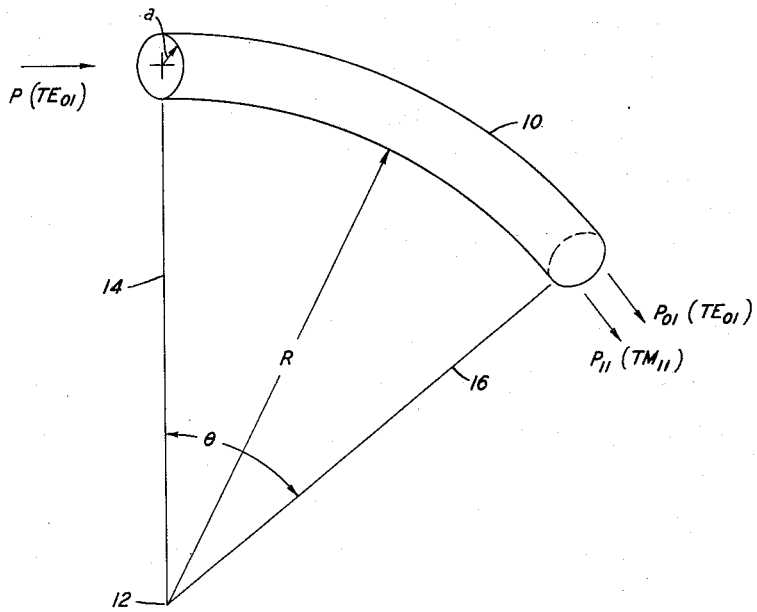
Figure 2A:
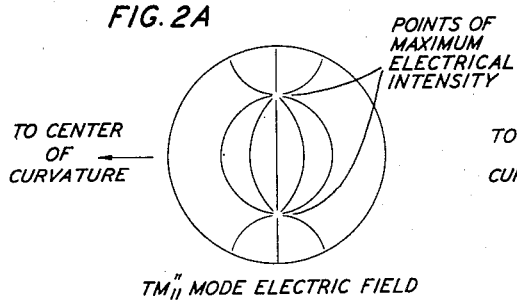

When a pure $TE_{01}$ wave in a wave guide of circular cross-section is propagated into a longitudinally, single plane, curved section 10, such as that shown in Fig. 1, theory, which is based on the assumption that there is no dissipation in the wave guide, shows that energy is transferred from the $TE_{01}$ mode to the $TM_{11}$ mode. In Fig. 1, $a$ is the radius of the circular cross-sectional area of wave guide 10, R is the radius of the bend taken between the center of curvature 12 and the nearer edge of guide 10, and $\theta$ is the angle between the radii of the bend at the extreme left and right ends of the bend, respectively, as shown on the drawing. At the so-called "discrete angle" $\theta_c$ which is defined by the relation $$\theta_c = \frac{\Pi}{2.32} \frac{\lambda_0}{a} \text{ (radians)} \qquad (2)$$

where $a$ is the wave-guide radius, as mentioned above, and $\lambda_0$ is the free space wavelength, the power emerging from the bend is entirely in the $TM_{11}''$ mode, with orientation as shown in Fig. 2A of the drawings. In other words, the "discrete angle" $\theta_c$ is that for which input $TE_{01}$ mode waves are completely transformed into $TM_{11}''$ mode output waves or vice-versa. This angle $\theta_c$ is alternatively also known and referred to as the "critical angle" or the "extinction angle." At other bend angles $\theta$, the amplitudes of the $TE_{01}$ and $TM_{11}''$ waves emerging from the bend into straight pipe may be expressed (for input normalized to unity) by the relations:

$$TE_{01} \text{ amplitude} = \cos\left(\frac{\Pi}{2} \frac{\theta}{\theta_c}\right) \qquad (3)$$

$$TM_{11}'' \text{ amplitude} = \sin\left(\frac{\Pi}{2} \frac{\theta}{\theta_c}\right) \qquad (4)$$

Figure 3:
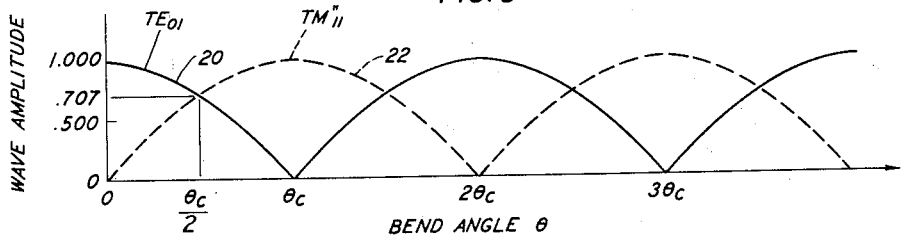
Fig. 3 illustrates the amplitude versus bend angle characteristics of $TE_{01}$ and $TM_{11}$ waves in a wave guide of circular cross-section the longitudinal axis of which is curved or bent in one plane.

This behavior is graphically illustrated by the solid line curve 20 for $TE_{01}$ waves and the broken line curve 22 for $TM_{11}$ waves in Fig. 3. There is a 90 degree time phase difference between the transverse magnetic intensities of the $TE_{01}$ and $TM_{11}''$ components at the bend output.

The behavior of a specific section of curved line in terms of its input and output waves, as given above, is substantially independent of the bending radius for gradual bends. The reason lies in the fact that the $TE_{01}$ wave is degenerate with (and therefore has the same phase velocity as) the $TM_{11}$ wave, one of the modes which is coupled to the $TE_{01}$ mode by the bend.

Figure 4:
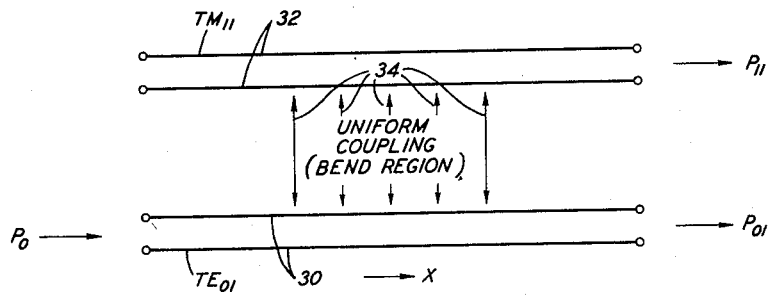
Fig. 4 is a diagrammatic representation showing the coupled transmission line equivalent of a single plane bend in a wave guide of circular cross-section.

This may be stated more quantitatively in terms of the coupled transmission line equivalent of the bent round wave guide, Fig. 4. When the coupled lines 30 and 32 of Fig. 4, representing the $TE_{01}$ and $TM_{11}$ waves in the wave guide, respectively, are dissipationless and have the same phase velocity, it may be shown that $$\frac{P_{11}}{P_0} = \sin^2(cx) \qquad (5)$$

$$\frac{P_{01}}{P_0} = \cos^2(cx) \qquad (6)$$

where $P_0$ is the input power ($TE_{01}$ wave), $P_{01}$ is the output power ($TE_{01}$ wave), $P_{11}$ is the output power ($TM_{11}$ wave), $c$ is the coupling per unit length indicated by arrows 34 on Fig. 4 and $x$ is the length coordinate. Thus, the bend output is uniquely determined by the product of path length and coupling per unit length. The path length for a given angle varies as the bending radius, and the coupling per unit length varies inversely as the bending radius for gradual bends; hence the product of coupling path length times coupling per unit length is, for gradual bends, dependent only on the total bend angle.

An alternative description of the wave propagation in the bend region itself may be given in terms of modes which are orthogonal in the bend region. The $TE_{01}$ and $TM_{11}''$ (Fig. 2A) modes of straight circular pipe are not normal modes of the curved region. When a pure $TE_{01}$ wave is impressed on the input of the curved region, the energy divides equally into two of the normal modes of the curved region. Because familiar mathematical functions do not describe simply the propagation effects in the curved region, the solution for these effects is obtained by perturbation theory and the curved region's normal modes are described in terms of combinations of the normal modes of straight circular pipe.

The two normal modes of the curved region which are excited equally by pure $TE_{01}$ bend input are:

| Mode | Propagation Constant |
|---|---|
| $(TE_{01} + TM_{11}'')$ | $i\frac{2\Pi}{\lambda_0}\left[(1-\nu^2)^{1/2} + \frac{a}{\sqrt{2}\,3.83R}\right]$ (7) |
| $(TE_{01} - TM_{11}'')$ | $i\frac{2\Pi}{\lambda_0}\left[(1-\nu^2)^{1/2} - \frac{a}{\sqrt{2}\,3.83R}\right]$ (8) | in which $\nu$ is the ratio of free space wavelength to cut-off wavelength in straight circular pipe. Each of these normal modes contains equal amounts of energy in the $TE_{01}$ and $TM_{11}''$ field distributions; the time phase difference between the $TE_{01}$ and $TM_{11}''$ transverse magnetic intensities is either 0 degrees or 180 degrees.

After traveling in curved pipe through an angle $\theta$ the phase difference between the $(TE_{01}+TM_{11}'')$ and $(TE_{01}-TM_{11}'')$ modes is $$\frac{2\Pi}{\lambda_0}\frac{\sqrt{2}\,a\theta}{3.83} = \frac{2.32\,a\theta}{\lambda_0} \text{ radians} \qquad (9)$$

Figure 2B:
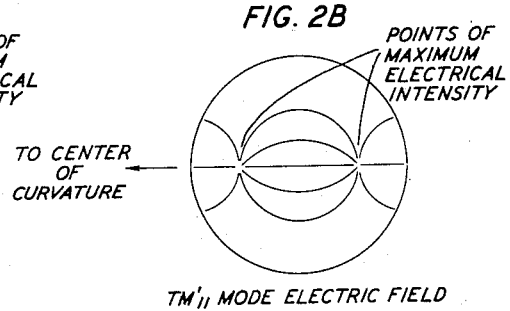

The mode $TM_{11}'$ whose orientation is given in Fig. 2B is normal in both straight and bent circular pipe (to the second order of approximation) and has a propagation constant of $$i\frac{2\Pi}{\lambda_0}(1-\nu^2)^{1/2}$$

in both curved and straight pipe.

Section 2.—Discrete angle bend solution

The most elementary solution to the problem of taking the circular electric wave around bends is to use a total bend angle of $2\theta_c$, $4\theta_c$ — or $n\theta_c$, where $n$ is an even integer. As shown by curve 20 of Fig. 3, at these angles the energy is back in the $TE_{01}$ wave. The limitations of this approach are two-fold; (1) only certain specific bend angles are allowed, certainly a severe restriction in most practical installations, and (2) the frequency band width of the solution is limited, since $\theta_c$ (Equation 2) is a direct function of $\lambda_0$. In Fig. 5 curves 36 and 38 show the energy loss for the $TE_{01}$ wave in bends of $2\theta_c$ and $4\theta_c$, respectively, as a function of departure from the mid-band frequency. For band widths of $\pm 5$ percent or less the loss may be tolerable, but at $\pm 25$ percent or more band width (which the straight wave guide itself is entirely capable of handling) excessive bend losses occur.

Section 3.—Solution by degeneracy removal

In most types of transmission lines, geometric changes of the type associated with bends, impedance level changes, or even mode type transformations may be made without undesired effects provided the transition per wavelength along the axis of propagation is not too large. This is the familiar tapered transmission line approach. Why, then, is it that a very gradual bend is as bad as a more rapid bend in causing $TE_{01}$ wave loss? The answer lies in the fact that the bend couples the $TE_{01}$ wave to a mode, $TM_{11}$ wave, which has the identical phase velocity. If we remove this $TE_{01} - TM_{11}$ degeneracy we create a situation in which a gradual bend causes less loss than a more rapid bend because the components of energy transferred from $TE_{01}$ to $TM_{11}''$ at different locations along the axis of propagation no longer add in phase.

The change in transmission effects, which result when the degeneracy is removed, can be analyed on a coupled transmission line basis as discussed above in connection with Fig. 4. For the purposes of such an analysis we can, at present, consider only the $TE_{01}$ to $TM_{11}$ coupling in a bend and assume that the coupling coefficient between these modes is not altered by the structural modification which removes the degeneracy. This value of coupling coefficient, in terms of the parameters $a$, $R$ and $\lambda_0$, defined above, is $$c = \frac{1.16\,a}{R\lambda_0} \qquad (10)$$

which, when used in Equations 5 and 6, above, will give the same amplitude for $TE_{01}$ and $TM_{11}''$ waves as Equations 3 and 4 above, for the output of a curved pipe of circular cross-section.

In the altered or modified guide, in which the degeneracy has been removed, the propagation constant of at least one of the modes must be other than that for the circular wave-guide value, and the modes should therefore be given new designations. We shall, accordingly, designate the modified $TE_{01}$ wave as $TE_{01}{}^m$ and the modified $TM_{11}''$ wave as $TM_{11}''{}^m$.

Considering the dissipationless case only, for the present, it is found that an index of transmission performance in the curved modified line is $$\frac{\beta_{01}{}^m - \beta_{11}''{}^m}{c} \qquad (11)$$

where $\beta_{01}{}^m$ and $\beta_{11}''{}^m$ are the phase constants of the $TE_{01}{}^m$ and $TM_{11}''{}^m$ waves, respectively, in straight modified line. The amplitudes of $TE_{01}{}^m$ and $TM_{11}''{}^m$ at the end of a curved section of modified line are plotted in Fig. 6A and Fig. 6B, respectively, for the values 0, .5 and 2 of the parameter 1, respectively, as shown by curves 40, 42 and 44 of Fig. 6A and curves 46, 48 and 50 of Fig. 6B, respectively. The abscissa is bend angle, expressed as multiples of the discrete or extinction angle $\theta_c$ for circular guide of the same radius.

Figs. 6A and 6B, taken together, show that the energy exchange between modes is still periodic as a function of bend angle when the degeneracy is broken, but the maximum energy lost from $TE_{01}$ is reduced as the ratio 11 is made large.

Curves 52 and 54 of Fig. 7 show the amplitudes of the $TM_{11}''^m$ and $TE_{01}^m$ waves, respectively, at the bend angle where maximum energy transfer has taken place, as a function of the ratio 11.

In order to relate the ratio 11 to physical quantities it is convenient to rewrite ratio 11 as $$\frac{2\Pi R}{1.16a}(\sqrt{1-(\nu_{01}^m)^2}-\sqrt{1-(\nu_{11}''^m)^2}) \quad (12)$$

which gives the abscissa for Fig. 7 in terms of the $\nu$'s which are the free space to cut-off wavelength ratios for the $TE_{01}^m$ and $TM_{11}''^m$ modes in straight modified wave guide.

When the $TE_{01}$ and $TM_{11}$ modes are far from cut-off as is the case in low loss wave guides, $\nu^2 \ll 1$ and the expression 12 becomes $$\frac{\Pi R}{1.16a}((\nu_{11}''^m)^2-(\nu_{01}^m)^2) \quad (13)$$

By way of a specific example, to place the order of magnitude, the following figures are given. For a 50,000 megacycle wave in a 2 inch diameter wave-guide pipe, a 0.5 percent difference in cut-off wavelength between $TE_{01}$ and $TM_{11}$ waves would yield a ratio 13 of 20 for a bending radius of 2,960 feet, corresponding to less than 0.05 decibel maximum loss to $TE_{01}$ waves (at worst bend angle); and a wave-guide length of 4,650 feet would be required to negotiate a 90 degree bend.

For guides far from cut-off, as in the case chosen, the allowable bending radius: (1) Varies linearly with the $TE_{01}-TM_{11}$ cut-off wavelength difference, (2) Varies directly as the ratio $\lambda_0^2/a^3$, (3) Decreases as the acceptable $TE_{01}$ bend loss increases (see Fig. 7, noting $$\frac{\beta_{01}^m-\beta_{11}''^m}{c}$$

varies directly as the bending radius $R$).

In principle, the problem of transmitting the circular electric wave around bends can be solved by breaking the $TE_{01}-TM_{11}$ degeneracy; the question is, how much increase in $TE_{01}^m$ versus $TE_{01}$ heat loss will occur when the wave guide has been altered to remove the degeneracy. To answer this we must consider a specific structure.

*Section 4.—Elliptic wave-guide solution*

One way of removing the $TE_{01}-TM_{11}$ degeneracy is to deform the walls of the circular wave guide. An elliptic guide is a specific example of such a deformation. We are interested herein in small amounts of eccentricity, that is, referring to Fig. 9B, where the maximum diameter $d_{max}$ of elliptical wave guide 63 is not substantially larger than the minimum diameter $d_{min}$, and need, for purposes of mathematical analysis, to know the cut-off wavelengths and attenuation constants very accurately. The computations reported herein are based on new derivations made by Miss M. C. Gray of the Bell Telephone Laboratories, Incorporated.

For the $TE_{01}^m$ mode in slightly elliptic guide, Miss Gray determines that the cut-off constant is $$k_{01}^m=k\left(1+\frac{1}{4}e^2+\frac{k^2+10}{64}e^4\right) \quad (14)$$

where $k=3.831$ and $e$ is the eccentricity. The eccentricity $e$ is defined as the ratio of twice the focal distance to the length of the major axis of the ellipse. The $TM_{11}''$ mode of round guide may divide into two modes in an elliptic guide, depending on the location of the major and minor axes of the cross-section relative to the bending radius. For the "even" wave Miss Gray finds:

$$k_{11}''^m=k\left(1+\frac{1}{8}e^2+\frac{k^2+14}{256}e^4\right) \quad (15)$$

and for the "odd" wave $$k_{11}''^m=k\left(1+\frac{3}{8}e^2+\frac{k^2+62}{256}e^4\right) \quad (16)$$

The $TE_{01}^m-TM_{11}''^m$ cut-off wavelength difference is plotted as curve 60 of Fig. 8, based on Equations 14 and 15. For an eccentricity of about 0.3 there is a 1 percent cut-off wavelength difference. Curve 62 of Fig. 9A shows that an eccentricity of 0.3 corresponds to approximately 5 percent difference between the major and minor axes of the ellipse.

It is important that no new degeneracy with $TE_{01}$ waves be created by going to a deformed wave-guide cross-section, and investigation of the elliptical cross-section has shown that such is the case.

The heat losses for the $TE_{01}^m$ wave are given as $$\alpha_{01}^m=\frac{R}{\eta a}\left(\frac{\nu^2}{\sqrt{1-\nu^2}}\left[1+\frac{1}{4}e^3+\frac{k^2e_4}{16J_0^2(k)}\log\frac{1+\sqrt{1-e^2}}{e}\right]+\frac{k^2e^4}{32}\sqrt{1-\nu^2}\right) \quad (17)$$

The terminology employed is that used by Dr. S. A. Schelkunoff in his book entitled, "Electromagnetic Waves" published by D. Van Nostrand Co., New York, 1943. The relation between eccentricity and $TE_{01}^m$ loss in straight elliptic guide is plotted in curves 64 and 66 of Fig. 10 for wave-guide radii of 1 inch and $3/16$ inch, respectively, at a frequency of 50,000 megacycles. An eccentricity of 0.3 results in 25 percent to 35 percent more heat loss than in a circular guide, with little dependence on the proximity of the operating frequency to the cut-off frequency of the wave guide.

The allowable bending radius may now be calculated for a preselected maximum bend loss as a function of increased heat loss due to eccentricity. The steps are as follows. The ratio $(\beta_{01}^m-\beta_{11}''^m)/c$ is obtained from Fig. 7 for a preselected $TE_{01}^m$ loss due to bending at the angle of maximum conversion; for $(\beta_{01}^m-\beta_{11}''^m)/c$ equal to 20, by way of specific example, this bend loss is 0.043 decibel. Then for the selected condition, the ratio 12 is determined, from which the bending radius may be calculated as a function of eccentricity. The increased heat loss due to eccentricity is also known (Equation 17 and Fig. 10), so the bending radius may be plotted directly as a function of increased heat loss due to eccentricity. The results are given in curves 70 to 75, inclusive, of Figs. 11 and 12 for guides of 2 inches and $3/8$ inch diameter, respectively, operated at 50,000 megacycles, for maximum bend losses of .043, .171 and .64 decibel, respectively, as indicated adjacent to each curve.

In the 2 inch diameter low loss guide, bending radii on the order of 250 to 1000 feet may be tolerated, depending on the maximum bend loss which can be accepted, at a penalty of up to 50 percent increase in heat loss above the value for a comparable wave guide of circular cross-section. In the $3/8$ inch diameter wave guide, which might, for example, be used in short runs, a bending radius as low as one foot may be tolerable.

Curves 80, 81 and 82 of Fig. 13 show the allowable bending radius versus wave-guide diameter for operation at a frequency of 50,000 megacycles and for an eccentricity of 0.3, with maximum bend loss as a parameter, as indicated adjacent to each curve.

Dissipation in the guide walls, which will be discussed in a subsequent paragraph, alters the elliptic guide bend performance for very large bending radii but does not detract from its usefulness in avoiding bend losses.

From the above analysis it appears that elliptic wave guides such as 63 of Fig. 9B present one solution to the bend problem as illustrated in Fig. 14A. To avoid losses due to accidental deviations from straightness, the long lines 91 and 98 may be given some eccentricity as shown by the cross sections of Figs. 14B and 14D. If more rapid bends must be negotiated, a guide 93 of greater eccentricity, as shown by the cross section of Fig. 14C, can be employed in the bend region 95 only, with suitable tapers 96 and 97 in the straight sections 91 and 98 adjacent to the bend 93. Taper angles of the order of 2 degrees are satisfactory. By way of example, for nominally straight long lines 91 and 98 an eccentricity $e$ of between 0.1 and 0.4 can be employed and where more rapid bends 93 are to be negotiated an eccentricity $e$ of between 0.3 and 0.5, determined in accordance with the procedures described in detail above, can be employed. In general, non-elliptical, symmetrical or non-symmetrical, oval cross-sectional wave guides will produce comparable effects to that of the elliptically cross-sectional wave guide which they most closely approximate.

Section 5.—Alternate methods of removing the degeneracy

In general, any alteration in the circular guide which affects the $TE_{01}$ and $TM_{11}$ waves differently will remove the degeneracy and thus becomes a potential solution to the bend problem. One such alteration is to put circular corrugations in the wall transverse to the axis of propagation, forming a structure similar to the familiar sylphon bellows.

The remarkable $TE_{01}$ wave transmission characteristics of this structure were first demonstrated by A. P. King. Various species of the structure are disclosed and claimed in his copending application, Serial No. 201,792, filed December 20, 1950 (which matured into U. S. Patent 2,751,561, issued June 19, 1956) and assigned to applicant's assignee. He finds that the circular electric wave undergoes bend losses of 0.1 decibel or less for bends as large as the critical angle (also known as the "discrete" or "extinction" angle). The spacing between corrugations is made a small fraction of a wavelength so that $TE_{01}$ propagates very nearly as though in a uniform circularly cylindrical pipe or wave guide, whereas the $TM_{11}$ wave experiences additional loading due to the radial grooves. Thus the degeneracy is removed. The mechanical flexibility of this structure, combined with its ability to efficiently transmit $TE_{01}$ without degeneration in bends, makes it very attractive in certain applications.

Section 6.—Normal mode solution

Another approach to the problem of effecting efficient transmission through a bend or curved portion of wave guide of circular cross-section, is to utilize throughout said portion one of the normal modes of the curved round guide. In accordance with the method of this approach, the $TE_{01}$ wave is converted to the selected normal mode (of the bend) wave for transmission through the bend and the normal mode (of the bend) wave is converted back to a $TE_{01}$ wave after passing through the bent or curved portion of the wave guide. There are many normal mode waves for a bent or curved wave guide of circular cross-section, but the ones most closely related to the $TE_{01}$ wave are, as mentioned above, the $TM_{11}'$ (Fig. 2B), and the $TE_{01} \pm TM_{11}''$ waves.

A block schematic diagram illustrating the application of the normal mode solution is shown in Fig. 15, wherein 102 is a first section of straight wave guide of circular cross-section and 108 is a second section of like wave guide, the longitudinal axes of said first and said second sections being at an angle such that a third smoothly curved section of wave guide 100, of like diameter with sections 102 and 108, is required to join the upper ends of sections 102 and 108. Mode transducers 104 and 106 which are normally of identical construction, and which can take any of several forms to be described in detail hereinunder, are interposed between the curved section 100 and the upper ends of sections 102 and 108, respectively, as indicated in Fig. 15. It is desired for more efficient transmission through the straight sections of wave guide 102 and 108 that $TE_{01}$ mode waves be employed. However, in the curved section 100, the $TE_{01}$ mode waves would degenerate into spurious or unwanted mode waves as discussed at length above. Mode transducers 104 and 106 are, therefore, employed to convert the $TE_{01}$ waves entering section 100 from either section 102 or 108 to a normal mode wave such, for example, as the $TM_{11}'$ mode wave for the curved section 100 and to convert waves leaving section 100 at either end of the section, back from the chosen normal mode for the curved section to the $TE_{01}$ mode wave desired for the straight sections 102 and 108. Thus bends of arbitrary length can be negotiated.

The next question which arises, is how can suitable mode transformations be effected? The $TM_{11}''$ mode may be formed from the $TE_{01}$ wave using a section of curved wave guide of circular cross-section having a total angle $\theta_c$ (discrete or extinctive angle) as given by Equation 2. The $TM_{11}'$ mode may in turn be formed by rotating the polarization of the $TM_{11}''$ wave in a section of straight elliptic guide whose major and minor axes are inclined at 45 degrees to the initial polarization of the $TM_{11}''$ wave. The combination of a $\theta_c$-angle bend and a suitable length of elliptic guide as just described, therefore, constitutes a $TE_{01}$ to $TM_{11}'$ mode transducer for use as units 104 and 106 in the arrangement of the schematic diagram of Fig. 15. The longitudinal axes of all elements of this arrangement lie in one plane. The elliptic section of wave guide should be on the side toward the section of wave guide 100 for both transducers 104 and 106. By way of a specific example, for an elliptical wave-guide cross-section having major and minor axes of 10.5 centimeters and 9.5 centimeters, respectively, a length of approximately 7 meters is suitable. In general, the length depends upon the eccentricity.

As an alternative, the section of elliptic guide can be eliminated from the mode transducer by making the $\theta_c$-angle (discrete or extinctive angle) bend in a plane perpendicular to the plane of the arbitrary bend, thereby presenting the aribtrary bend with an input wave of $TM_{11}'$ which is a normal mode of the curved region. This reduces the mode transducer to a simple $\theta_c$-angle bend, but puts the elements of the bend (the mode transducers and arbitrary bend) in a three dimensional arrangement between the two straight guides which it is the objective to join. In practice this method can be employed where the two straight sections of guide to be joined are, or can readily be, suitably displaced with respect to each other.

As further alternative forms which mode transducers 104 and 106 of Fig. 15 can take, Figs. 16A, 16B, 16C and 16D show two transducers from $TE_{01}$ to normal modes of the bend region wherein all elements are in a single plane.

Figure 16A:
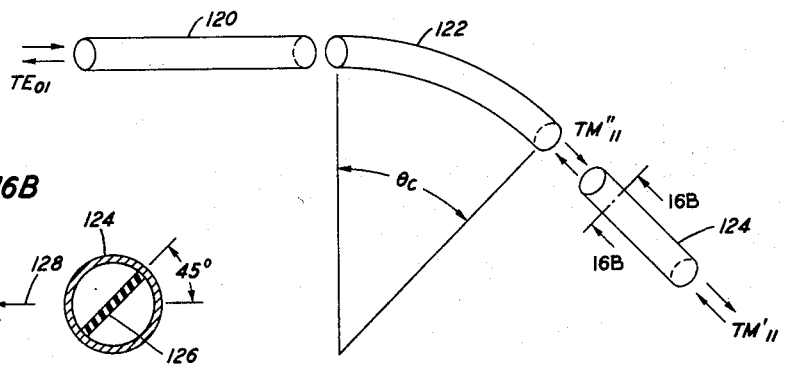
Figure 16B:
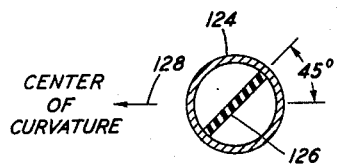

The mode transducer illustrated by Figs. 16A and 16B employs a first smoothly-curved, single plane, wave-guide bend 122 of circular cross-section having the same internal diameter as the straight section of like wave guide 120. The angle of the curved section 122 is the discrete or extinctive angle $\theta_c$, as shown in Fig. 16A (as defined in Equation 2), and converts the $TE_{01}$ mode waves into $TM_{11}''$ mode waves. To complete the desired mode transformation, a second section 124 is added and comprises a straight section of wave guide of circular cross-section having the same internal diameter as sections 120 and 122. Within section 124 is a diametrically positioned sheet of dielectric 126 running the length of section 124 and inclined, as shown in the cross-sectional view of Fig. 16B of section 124, at an angle of 45 degrees with respect to the direction of the center of curvature of the bend of the section 132, this latter direction being indicated by arrow 128 of Fig. 16B. The dielectric sheet 126 can, for example, be of polystyrene and have a uniform thickness of $\frac{1}{20}$ the diameter of the wave guide. The ends of the dielectric sheet 126 may be pointed or notched, in accordance with principles well understood by those skilled in the art, to avoid substantial impedance mismatch. The section 124 and dielectric member 126 should be many wavelengths long of the lowest frequency wave to be employed, for example 20 wavelengths. This is necessary in order to avoid unwanted mode conversion effects.

Section 124 effects a rotation of 90 degrees of the polarization of the $TM_{11}''$ mode wave thereby converting it into a $TM_{11}'$ mode wave for transmission through the arbitrary curved section of wave guide (section 100 of Fig. 15, for example) which it is desired to introduce to couple two differently directed straight sections of wave guides (sections 102 and 103 of Fig. 15, for example). At the other end of the arbitrary curved section an identical mode transducer comprising sections 122 and 124, with the latter section adjacent to the arbitrary curved section, is employed to convert the $TM_{11}'$ mode wave back to a $TE_{01}$ mode wave for transmission through a straight section of wave guide (section 103 of Fig. 15, for example).

Figure 16C:
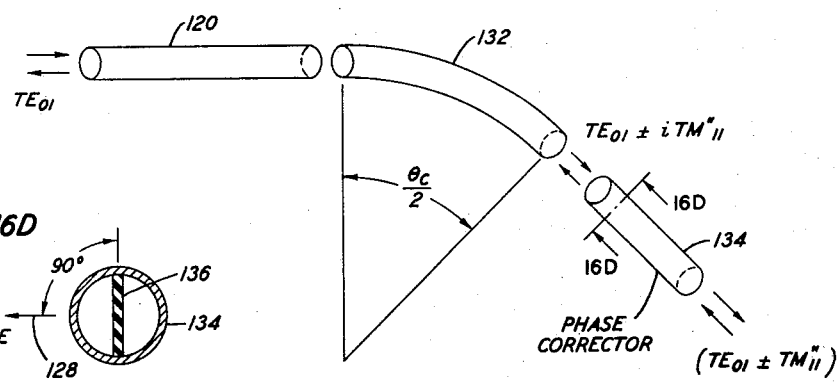
Figure 16D:
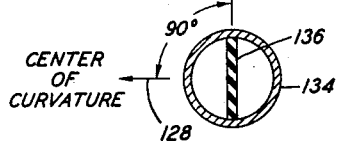

The mode transducer illustrated by Figs. 16C and 16D employs a first smoothly-curved, single plane, wave-guide bend of circular cross-section 132 having the same internal diameter as the straight section of like wave guide 120. The angle of the curved section 132 is one-half of the discrete or extinctive angle $\theta_c$, as show in Fig. 16C (as defined in Equation 1) and converts the $TE_{01}$ mode wave into a composite wave designated as $$(TE_{01} \pm iTM_{11}'')$$

mode wave, the input power being divided equally between the two modes of the composite wave. This composite wave, however, is not a normal mode for transmission through a curved section of wave guide because there is a 90 degree time phase difference between the $TE_{01}$ and the $TM_{11}''$ transverse magnetic intensities instead of the required zero or 180 degree difference. This 90 degree time phase difference is indicated by including the symbol $i$ before the $TM_{11}''$ mode in the composite designation. It is, therefore, necessary to include, with section 132, the section 134, a right cross-sectional view of which is shown in Fig. 16D. Section 134 is substantially identical to section 124 except that its diametrically positioned dielectric member 136 (Fig. 16D) is at an angle of 90 degrees with respect to the direction of the center of curvature of the curved section of guide 132 as indicated on Fig. 16D where arrow 128 indicates said direction of curvature.

The sections 124 and 134 described above, are, obviously, alternative devices which can be employed in place of the section of elliptic guide in the combination of a discrete or extinctive bend and a section of elliptic guide, described hereinabove. A greater facility of adjustment is afforded, as a practical matter, with devices 124 and 134, however.

A further alternative and effective $TE_{01}$ to $TM_{11}'$ mode transducer has been designed by S. P. Morgan, Jr. and is disclosed and claimed in his copending application Serial No. 226,869, filed May 17, 1951, which application is assigned to applicant's assignee. The structure, illustrated in Figs. 17A and 17B, consists of a half-circular cylinder of low loss dielectric material 152 assembled within a section of straight wave guide 150 of circular cross-section, as shown in the drawing. The dielectric constant of member 152 relative to that for free space (i. e., $\epsilon_r$) is very nearly unity. A number of "dielectric foam" materials suitable for use in element 152 are well known to those skilled in the art. For a length "$e$" of this half-circular cylinder such that $$e = \frac{2.073 \lambda_0}{\epsilon_r - 1} \quad (18)$$

where $\gamma_0$ is the free space wavelength, Morgan determines that a $TE_{01}$ mode incident wave is completely converted to a $TM_{11}$ mode wave. The orientation can obviously be made such that the transducer output is effectively in the $TM_{11}'$ mode at the start of the arbitrary bend.

Morgan has also found it possible to make the transformation $TE_{01}$ to $TE_{01} \pm TM_{11}''$ in a structure similar to that illustrated in Figs. 17A and 17B under certain conditions. The latter structure can be employed in place of the $\theta_c/2$-angle bend 132 in Fig. 16C, the length required being one-half that given by Equation 18.

One disadvantage of all the "normal mode" solutions described above is that the mode conversions necessary at the ends of the bend are frequency sensitive. Band widths on the order of those described in connection with the curves of Fig. 5 can therefore be expected of this general approach.

*Section 7.—The dissipation solution*

The $TE_{01}$ to $TM_{11}''$ mode conversion which takes place in a curved wave guide of circular cross-section follows curves 20 and 22 of Fig. 3 only in the limit of zero dissipation. The effects of dissipation will now be discussed.

One way of showing the effects dissipation may have is to consider how ideal mode filters alter curved waveguide performance. In the diagrammatic block diagram of Fig. 18, a straight portion of wave guide of circular cross-section 160 is shown joined to a smoothly-curved section of similar wave guide, said curved portion comprising subportions 162, 163, 164 and 165, and having a total bend angle of $\beta$ as shown in Fig. 18. Suppose in the diagrammatic illustration of Fig. 18 the bend angle $\beta$ were equal to $\theta_c$ and no mode filters were used; then, as described in Section 1 above, the bend output in $TE_{01}$ mode waves would be zero, i. e., a complete loss of the $TE_{01}$ signal. Suppose we now insert at the half angle $\beta/2$ a mode filter with no loss to the $TE_{01}$ wave and complete absorption of $TM_{11}$ wave. Such a filter has been substantially achieved in practice by a straight section of wave guide following substantially the method of construction disclosed in the copending application of W. J. Albersheim Serial No. 130,670, filed December 2, 1949 (which matured into U. S. Patent 2,649,578, issued August 18, 1953), for the wave-guide elbow illustrated in Fig. 4 of said application. This type of structure is also illustrated in Figs. 20E, 20F and 20G of the accompanying drawings and will be described in detail hereinafter. The $TE_{01}$ output of the first $\beta/2$-angle bend plus the centrally positioned mode filter would be (from Equation 3)

$$\cos\left(\frac{1}{2}\frac{\Pi}{2}\right) = 0.707 \quad (19)$$

for unit $TE_{01}$ wave as the bend input, and there would be no $TM_{11}$ output from the mode filter. At the output of the second half of the bend, however, the $TE_{01}$ wave amplitude would be $$\cos^2\left(\frac{\Pi}{4}\right) = 0.5 \quad (20)$$

Thus by adding dissipation at the center point of the bend to $TM_{11}$ only, the $\theta_c$-angle bend loss to the $TE_{01}$ wave has been decreased from infinite loss to a 6 decibel loss. For the condition of $n$ $TM_{11}$ mode filters or absorbers inserted at equal intervals along the $\theta_c$-angle bend, as indicated in the diagram of Fig. 18 for the case $n=3$, the $TE_{01}$ wave bend output is $$\cos^{n+1}\left(\frac{\Pi}{2(n+1)}\right) \quad (21)$$

This function has been plotted as curves 170 and 172 of Fig. 19 for the total bend angles of $\theta_c$ and $$\frac{\theta_c}{4}$$

respectively. As the number of $TM_{11}$ wave mode absorbers is increased without limit the $TE_{01}$ bend loss approaches zero. For an arbitrary bend of angle $\beta$ and $n$ equally spaced mode filters, the amplitude of the $TE_{01}$ wave bend output is $$\cos^{(n+1)}\left(\frac{\beta\Pi}{2(n+1)\theta_c}\right) \qquad (22)$$

Curve 172 of Fig. 19 shows this relation for the bend angle $\beta=\theta_c/4$, as noted above.

There are structures which make use of dissipation to transmit the $TE_{01}$ circular electric waves around bends with low loss, a few of which are illustrated in Figs. 20A to 20K, inclusive. The characteristic which these structures have in common is very high transmission loss for the modes to which energy tends to be transferred and very low transmission loss to the $TE_{01}$ or circular electric mode waves. The ability of the structure of Figs. 20E, 20F and 20G to transmit $TE_{01}$ mode waves around bends without degeneration has been known for some time as evidenced by the above-mentioned copending application of W. J. Albersheim.

The arrangement illustrated in Figs. 20A (side view) and 20B (cross-sectional view) comprises a smoothly-curved section of wave guide 180 of circular cross-section in which are assembled two thin, resistive, diametrically positioned sheets or vanes 182 and 184, respectively, arranged at right angles to each other and extending throughout the length of section 180. Sheets 182 and 184 can, for example, be of carbon-coated polystyrene. This structure effectively suppresses by attenuation any but the circular electric mode waves. A greater number of diametrically positioned resistive sheets or vanes placed with substantially equal angles between each pair of successive vanes can be employed if greater attenuation of the unwanted mode power is desired.

The arrangement illustrated in Figs. 20C (side view) and 20D (cross-sectional view) comprises a smoothly-curved section of wave guide 186 of circular cross-section in which are assembled two resistive rods 188 and 190, respectively, the rods being placed at the two positions of maximum electrical field intensity, respectively for the $TM_{11}''$ mode wave (see Fig. 2A). Dielectric spacers not shown, regularly distributed along member 186, may be employed to maintain rods 188 and 190 in their respective proper positions. Rods 188 and 190 can be, for example, of carbon-coated polystyrene.

This structure is effective in suppressing by attenuation the $TM_{11}''$ mode wave provided the rods are maintained at the positions of maximum electrical field intensity for that wave. If rotated in position by 90 degrees the structure will, of course, be effective for suppressing the $TM_{11}'$ mode wave (see Fig. 2B) or if four rods are employed, one pair can be positioned to suppress the $TM_{11}''$ mode wave and the other pair can be positioned to suppress the $TM_{11}'$ mode wave. Additional pairs of rods to suppress other modes can be added if desired.

The structure illustrated by Figs. 20E (side view), 20F (longitudinal cross-sectional view) and 20G (transverse cross-sectional view) is as previously stated essentially of the type illustrated in Fig. 4 of the above-mentioned application of W. J. Albersheim (U. S. Patent 2,649,578, issued August 18, 1953).

Member 200 of Fig. 20E comprises a plurality of conductive ring members 206 of the cross-sectional views of Figs. 20F and 20G regularly spaced along the longitudinal axis of member 200, the ring members 206 being encased in and supported by a lossy housing 204 as illustrated in Figs. 20F and 20G. Lossy housing 204 can preferably be of carbon or iron-loaded polyethylene.

Since dissipation may be used to avoid $TE_{01}$ mode wave bend losses in special structures such as those described above, it appears to be in order to inquire whether or not dissipation in ordinary wave guides of circular cross-section will have an effect in reducing $TE_{01}$ bend losses. The attenuation constant for the $TM_{11}$ mode wave in 2 inch diameter, circular, wave guide at 50,000 megacycles is nearly 50 times the attenuation constant for the $TE_{01}$ mode wave in the same wave guide; thus the structure has a tendency to avoid bend loss to the $TE_{01}$ mode wave by virtue of dissipation normally present therein.

The effects of dissipation in smooth lines have been determined using the coupled transmission line analogy discussed in connection with Fig. 4. It has been determined that the amplitude of the $TE_{01}$ mode wave output of a bend is $$E_{TE_{01}}=\left[\frac{1}{2}-\frac{(\gamma_1-\gamma_2)}{2\sqrt{(\gamma_1-\gamma_2)^2-4c^2}}\right]\epsilon^{r_1 x}+ \\ \left[\frac{1}{2}+\frac{(\gamma_1-\gamma_2)}{2\sqrt{(\gamma_1-\gamma_2)^2-4c^2}}\right]\epsilon^{r_2 x} \qquad (23)$$

where $c$ = coupling per unit length along the bend
$x$ = length of wave guide in the bend
$\gamma_1=\alpha_{01}+i\beta_{01}$
 = $TE_{01}$ propagation constant
$\gamma_2=\alpha_{11}+i\beta_{11}$
 = $TM_{11}$ propagation constant
$r_1=-\frac{1}{2}(2ic+\gamma_1+\gamma_2)+\frac{1}{2}\sqrt{(\gamma_1-\gamma_2)^2-4c^2}$
$r_2=-\frac{1}{2}(2ic+\gamma_1+\gamma_2)-\frac{1}{2}\sqrt{(\gamma_1-\gamma_2)^2-4c^2}$ The $TE_{01}$ and $TM_{11}$ propagation constants $\gamma_1$ and $\gamma_2$ are for straight circular guide. It is assumed that the coupling "$c$" is unchanged by the presence of dissipation and is given by Equation 10. Because of the degeneracy, the imaginary part of the propagation constant is the same for $TM_{11}$ and $TE_{01}$, and $$(\gamma_1-\gamma_2)=(\alpha_{01}-\alpha_{11}) \qquad (24)$$

When $(\alpha_{01}-\alpha_{11})^2$ is very large compared to $4c^2$ so that $$\sqrt{(\gamma_1-\gamma_2)^2-4c^2}\simeq|\alpha_{01}-\alpha_{11}| \qquad (25)$$

The $TE_{01}$ amplitude given by Equation 23 approaches $$E_{TE_{01}}\simeq\epsilon^{r_1 x}$$

$$r_1\simeq-\alpha_{01}-i\left(c+\frac{\beta_{01}+\beta_{11}}{2}\right) \qquad (26)$$

Thus, the principal effect of a bend is to modify the imaginary portion of the propagation constant, provided that the ratio $$\left|\frac{\alpha_{01}-\alpha_{11}}{c}\right| \qquad (27)$$

is suitably large. For any given value of $(\alpha_{01}-\alpha_{11})$, the ratio (Equation 27) may be made as large as desired by making the value of $c$ small, i. e., by making the bending radius large. (See Equation 10.)

Another wave-guide structure providing for the attenuation of unwanted mode waves but freely transmitting the $TE_{01}$ circular electrode mode wave is illustrated by Figs. 20H and 20I. The structure illustrated by Figs. 20H and 20I is, obviously, closely related to that described above in connection with Figs. 20A and 20B, the essential difference being that the resistive vanes 252 and 254 of Figs. 20H and 20I do not extend across the entire diameter of the guide 250. As many pair of vanes 252, 254, can, of course, be employed as may be desirable and they can be positioned on diameters of the wave guide making substantially equal angles between each successive pair of diameters. The arrangement of Fig. 20I is simply that of Fig. 20H to which a curvature, as shown, has been imparted.

The structure illustrated by Figs. 20J and 20K is suitable for freely passing one polarization of the $TE_{11}$ dominant mode and attenuating other unwanted modes and polarizations of the dominant mode and comprises a section of wave guide 260 of circular cross-section to which has been added a pair of external channel members 262, 264, the channels in said members opening through longitudinal slots into the wave-guide section 260 as shown in the drawing. The channels in members 262, 264 are filled with highly dissipative or "lossy" material 263, such as polystyrene in which a substantial quantity of carbon particles has been embedded, or the like. As many pairs of diametrically opposed channels with dissipative fillers may be employed as is required to satisfactorily dissipate the desired quantity of unwanted mode and polarization power. Fig. 20K shows the section 260 to which a curvature has been imparted.

Curves 210, 212, 214 and 216 of Fig. 21 show the $TE_{01}$ bend loss versus bend angle with the ratio of Equation 27 as a parameter and having the values $0$, $-1$, $-10$ and $-100$, respectively. The bend loss is considered to be the actual $TE_{01}$ bend output compared to the $TE_{01}$ output from the same length of straight wave guide. The curve 210, for $(\alpha_{01}-\alpha_{11})/c$ equal to zero, is the dissipationless case given by previous authors. For $(\alpha_{01}-\alpha_{11})/c$ greater than one the bend loss becomes appreciably less than predicted by theory based on no dissipation; for $(\alpha_{01}-\alpha_{11})/c=100$, the loss in a critical angle bend is under 0.15 decibel instead of the infiinite loss predicted by dissipationless theory. In practice smaller ratios (Equation 27) are likely to be encountered, however.

In the curves 220 to 227, inclusive, of Figs. 22 and 23, by way of specific examples, the bend loss is plotted versus the bending radius for some of the wave guides of interest at a frequency of 50,000 megacycles. Note that the total bend angles for which these curves apply is different, depending on the wave-guide diameter. Reducing the guide size reduces the bend loss at a rapid rate, because (1) the bend loss is less for guides nearer cut-off at the same fraction of a critical angle bend (as shown in the curves 220 to 227, inclusive, of Figs. 22 and 23), and (2) the critical angle becomes larger as the guide size is reduced.

For a critical angle (18.3 degrees) bend in a 2 inch diameter guide a bending radius of 35,000 feet is required to reduce the bend loss to 1 decibel. In a 1 inch diameter guide, this 18 degree bend with a bending radius of 35,000 feet would produce under 0.15 decibel bend loss (Fig. 22).

It is not too difficult as a practical matter to maintain unintentional deviations from straightness within 5 feet in 500 feet, in the form of an arc of a circle, and this condition corresponds to a bending radius on the order of 50,000 feet. This corresponds to a value of $(\alpha_{01}-\alpha_{11})/c$ of almost 20 in a 2 inch diameter wave guide at 50,000 megacycles. It is therefore apparent that the losses due to deviations from straightness will be significantaly reduced (compared to the predictions of dissipationless theory) by virtue of the normal loss in the circular wave-guide walls.

Intentional bends can in many instances be made in a radius on the order of 5,000 feet, which approximates the curves used on a high speed railroad. This corresponds to a value of $(\alpha_{01}-\alpha_{11})/c$ of about 2 in 2 inch diameter pipe, and the bend losses become undesirably large. One alternative is to go to 1 inch diameter pipe, thereby raising $\theta_c$ from 18.3 degrees to 36.6 degrees and also raising $(\alpha_{01}-\alpha_{11})/c$ from about 2 to 7.2. This would reduce the bend loss to around one decibel for a 20 degree bend. Another alternative involves the use of mode filters in the manner described in connection with Figs. 18 and 19. If an ideal mode filter were added every 100 feet along a bend of radius 5,000 feet, the bend would be divided into segments $\theta_c/6$ each (for 2 inch diameter pipe) resulting in a bend loss of about 0.04 decibel per 1.15 degree of bend. The ultimate attractiveness of this approach, compared to the "normal-mode" or "degeneracy-removal" approach depends on how closely an ideal mode filter can be approached in practice; $TE_{01}$ loss in the mode filter will, of course, limit the number of filters which can be added profitably.

*Section 8.—Conclusions*

The tendency for energy to be converted out of the circular electric wave in bent circular wave guides can be avoided by one of three general methods: (1) By removing the $TE_{01}-TM_{11}$ degeneracy, (2) By converting to a normal mode of the bent guide at both ends of the bend, (3) By utilizing dissipation in the unwanted modes to prevent power transfer to them. Methods 1 and 3 may be used singly or in combination for avoiding extreme straightness requirements on normally straight sections of line and for negotiating intentional bends.

Normal dissipation in solid wall or continuous wall round copper guide should be effective in moderating straightness requirements, but does not appear to make possible an attractive bending radius for intentional bends. Other wave-guide structures such as those of Figs. 20A to 20K, inclusive, may enable the dissipation approach to solve the intentional bend problem.

Removing the degeneracy by making the wave guide slightly elliptical or oval increases the normal heat loss for the modified $TE_{01}$ wave, and the tolerable bending radius is a compromise with this heat loss increase. For a heat loss increase of about 50 percent the tolerable bending radius is on the order of 300 to 1000 feet (depending on the bend loss which can be tolerated) for a 2 inch diameter guide operated at 50,000 megacycles. A transition from circular guide in straight runs to slightly elliptic guide for intentional bends is one way of avoiding the increased heat loss of the elliptic guide for the major portion of the line mileage.

Removal of the degeneracy and the dissipation of the unwanted modes result in no substantial limitations of band width and consequently, arrangements based upon these methods can be used with systems transmitting very wide frequency bands.

A number of methods of converting to a normal mode of the bend region have also been shown to be available, but since all of these appear to be limited to band widths on the order of 10 percent, they can be used only where relatively narrow frequency band signals are to be transmitted over the system.

It is apparent to those skilled in the art that numerous and varied structural embodiments, in addition to the the illustrative structures shown in the accompanying drawings and described in detail above, can readily be devised in accordance with the inventive principles explained in this application and within the scope of the present invention. The structures described are merely illustrative of the application of the principles of the invention and by no means exhaustively demonstrate the scope thereof.

What is claimed is:

1. In a wave guide transmission line for transmitting a very wide frequency range of high frequency electromagnetic waves in the circular electric mode, a plurality of long straight sections of wave guide of substantially circular cross section and at least one relatively short curved section of wave guide interposed between consecutive ones of said straight sections, said curved section having a substantially elliptical cross section to substantially eliminate the tendency of the circular electric mode wave to degenerate into other modes of wave energy.

2. The combination according to claim 1 in which said elliptical cross section has an eccentricity between 0.3 and 0.5, eccentricity being defined as the ratio of twice the focal distance to the length of the major axis of the ellipse.

3. The combination according to claim 1 in which the ratio of the maximum to the minimum diameter of said elliptical cross section is less than 1.2.

4. In a wave guide transmission line for transmitting a very wide frequency range of high frequency electromagnetic waves in the circular electric mode, a plurality of long straight sections of wave guide of substantially elliptical cross section having an eccentricity, defined as the ratio of twice the focal distance to the length of the major axis of the ellipse, of less than 0.3, and at least one relatively short curved section of wave guide of substantially elliptical cross section interposed between consecutive ones of said straight sections and having an eccentricity between 0.3 and 0.5, adjacent ones of said curved and straight sections being interconnected by a tapered section having a taper angle on the order of two degrees.

References Cited in the file of this patent

UNITED STATES PATENTS

| | | |
|---|---|---|
| 2,129,712 | Southworth | Sept. 13, 1938 |
| 2,180,950 | Bowen | Nov. 21, 1939 |
| 2,395,560 | Llewellyn | Feb. 26, 1946 |
| 2,632,804 | Jouguet | Mar. 24, 1953 |
| 2,656,513 | King | Oct. 20, 1953 |
| 2,706,278 | Walker | Apr. 12, 1955 |

OTHER REFERENCES

Ragan; Microwave Transmission Circuits, vol. 9 M. I. T. Rad. Lab. Series, McGraw-Hill, 1948, pp. 366–67. (Copy in Patent Office Library.)